United States Patent
Doi et al.

(10) Patent No.: US 9,333,949 B2
(45) Date of Patent: May 10, 2016

(54) WASHER SYSTEM FOR VEHICLE

(75) Inventors: Yuta Doi, Toyohashi (JP); Tomoyuki Kikuta, Toyohashi (JP); Yuji Hayashi, Toyohashi (JP)

(73) Assignee: ASMO CO., LTD., Shizuoka-pref. (JP)

( * ) Notice: Subject to any disclaimer, the term of this patent is extended or adjusted under 35 U.S.C. 154(b) by 961 days.

(21) Appl. No.: 13/484,543

(22) Filed: May 31, 2012

(65) Prior Publication Data
US 2013/0048035 A1  Feb. 28, 2013

(30) Foreign Application Priority Data

Aug. 22, 2011 (JP) ................................ 2011-180679
Dec. 14, 2011 (JP) ................................ 2011-273720

(51) Int. Cl.
*B60S 1/48* (2006.01)
*G02B 27/00* (2006.01)

(52) U.S. Cl.
CPC .............. *B60S 1/48* (2013.01); *G02B 27/0006* (2013.01)

(58) Field of Classification Search
CPC ....................................................... B60S 1/48
See application file for complete search history.

(56) References Cited

U.S. PATENT DOCUMENTS 6,357,483 B1 *   3/2002  Kobayashi ...................... 138/40
2006/0011223 A1 * 1/2006 Peterson et al. ............. 134/123
2011/0292212 A1  12/2011 Tanabe et al.

FOREIGN PATENT DOCUMENTS

JP  A-2004-182080  7/2004

OTHER PUBLICATIONS

U.S. Appl. No. 13/399,326, filed Feb. 17, 2012, Kikuta et al.

* cited by examiner

*Primary Examiner* — Jason Ko
(74) *Attorney, Agent, or Firm* — Posz Law Group, PLC

(57) ABSTRACT

Each of a plurality of nozzles is placed to correspond with a corresponding one of a plurality of washing subjects of a vehicle and is adapted to spray washer fluid over the corresponding one of the washing subjects upon receiving the washer fluid from a pump. A switch valve is adapted to switch a supply destination of the washer fluid, which is pumped from the pump, among the nozzles. A control conduit is placed in a flow path between an inlet of the switch valve and an outlet of a corresponding one of the nozzles and limits a flow quantity of the washer fluid, which is fed from the switch valve to the outlet of the corresponding one of the nozzles.

15 Claims, 8 Drawing Sheets

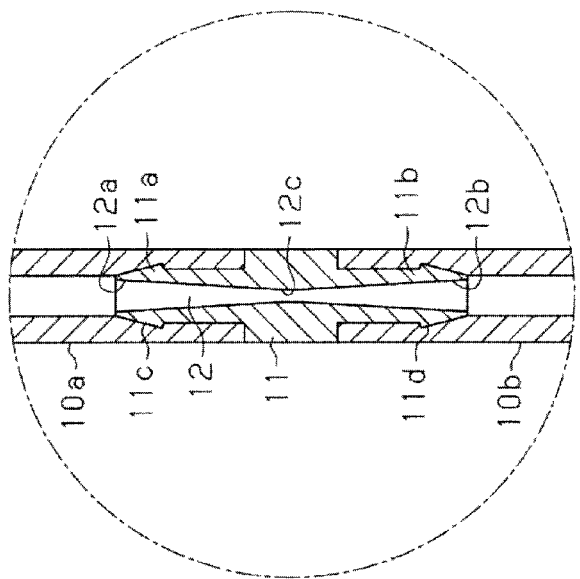
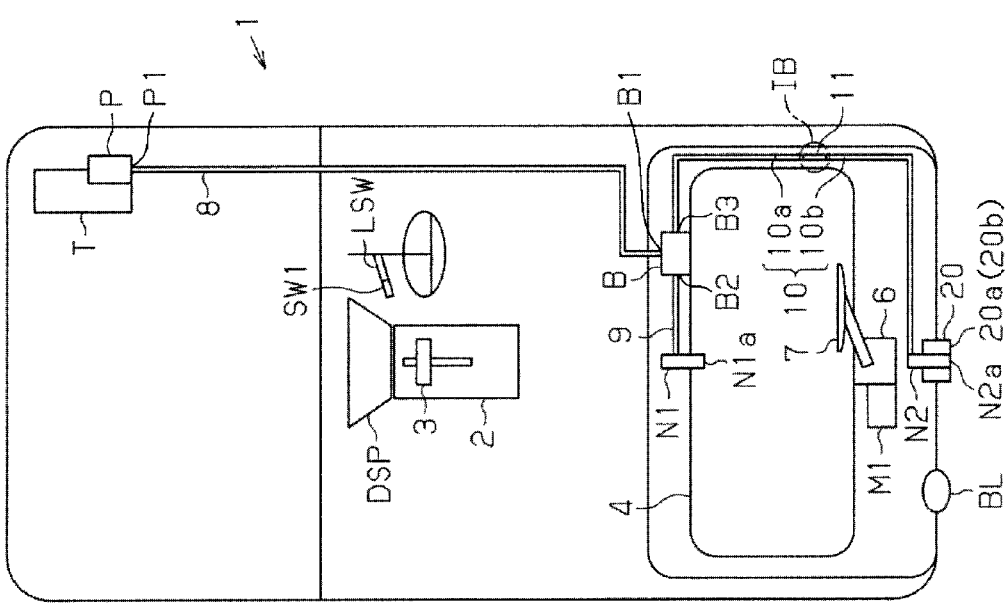

WASHER SYSTEM FOR VEHICLE

CROSS REFERENCE TO RELATED APPLICATION

This application is based on and incorporates herein by reference Japanese Patent Application No. 2011-180679 filed on Aug. 22, 2011 and Japanese Patent Application No. 2011-273720 filed on Dec. 14, 2011.

TECHNICAL FIELD

The present disclosure relates to a washer system for a vehicle.

BACKGROUND

Some vehicles have a system, which captures an image of a vehicle's outside view with an onboard camera and displays the captured image on a monitor of a vehicle navigation apparatus to assist a driver at the time of checking an area around the vehicle. The onboard camera is often placed at the outside of the vehicle, so that foreign objects, such as rain droplets, mud, dirt, will be likely adhered to and deposited on a front side of the onboard camera where a lens of the onboard camera is located. An image of these deposits may possibly be present in the captured image of the vehicle's outside view, which is captured with the onboard camera, to interfere with the capturing of the clear image of the vehicle's outside view. In view of the above disadvantage, for example, JP2004-182080A teaches a washer system. In this washer system, a branching portion, which includes a valve therein, is installed between a pump, which pumps washer fluid, and a nozzle, which sprays the washer fluid over a window glass. The washer fluid, which is supplied from the branching portion to the camera nozzle, is sprayed over the onboard camera to remove the deposits from the onboard camera.

A size of a subject surface area of the onboard camera (washing subject to be washed) is smaller than that of a subject surface area of the window glass (washing subject to be washed), and a flow quantity of the washer fluid required for the washing of the subject surface area differs between the window glass and the onboard camera. In the case of the above washer system where the supply destination of the washer fluid is simply switched between the onboard camera and the window glass, the same quantity of the washer fluid, which is the same as the quantity of the washer fluid set to be supplied to the window glass, is supplied to the front side of the onboard camera. Therefore, the washer fluid may be excessively supplied to the front side of the onboard camera to cause wasting of the washer fluid and heavy scattering of the washer fluid.

SUMMARY

The present disclosure addresses the above disadvantages. According to the present disclosure, there is provided a washer system for a vehicle, including a pump, a plurality of nozzles, a switching device and a flow limiter. The pump is adapted to pump washer fluid, which is stored in a tank of the vehicle, out of the tank. Each of the plurality of nozzles is placed to correspond with a corresponding one of a plurality of washing subjects of the vehicle and is adapted to spray the washer fluid over the corresponding one of the plurality of washing subjects upon receiving the washer fluid from the pump. The switching device is adapted to switch a supply destination of the washer fluid, which is pumped from the pump, among the plurality of nozzles. The flow limiter is placed in a flow path between an inlet of the switching device and an outlet of a corresponding one of the plurality of nozzles and limits a flow quantity of the washer fluid, which is fed from the switching device to the outlet of the corresponding one of the plurality of nozzles.

BRIEF DESCRIPTION OF THE DRAWINGS

The drawings described herein are for illustration purposes only and are not intended to limit the scope of the present disclosure in any way.

FIG. 1A is a schematic diagram of a vehicle having a washer system according to an embodiment of the present disclosure;

FIG. 1B is an enlarged view of an area IB shown in FIG. 1A;

DETAILED DESCRIPTION

Figure 2A:
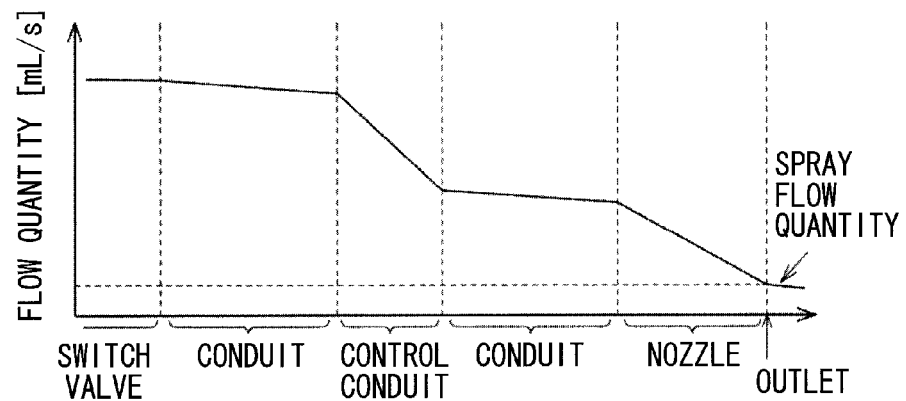
FIG. 2A is a diagram showing characteristics of a flow quantity of the washer system of the embodiment.

An embodiment of the present disclosure will be described with reference to the accompanying drawings.

A washer system according to an embodiment of the present disclosure will be described with reference to FIGS. 1A to 2B.

As shown in FIG. 1A, a shift lever 3 of a transmission 2 is placed on a lateral side of a driver's seat in a vehicle (e.g., an automobile) 1. When the shift lever 3 is manipulated by a driver (user) of the vehicle, a gear ratio of the transmission 2 is changed to change a speed of the vehicle 1. For instance, when the shift lever 3 is placed in a first speed position, the gear ratio of the transmission 2 is sifted to a first speed gear ratio. When the shift lever 3 is placed in a second speed position, the gear ratio of the transmission 2 is sifted to a second speed gear ratio. Furthermore, when the shift lever 3 is placed in a neutral position, the transmission 2 is sifted into a neutral state, disconnecting the transmission 2 from the driven road wheels.

When the shift lever 3 is placed in a reverse position, the vehicle 1 is enabled to move backward (placing the vehicle 1 into backwardly movable state, i.e., a reverse drive mode). At this time, a back lamp BL, which is provided at a rear side of the vehicle 1, is turned on, i.e., is lit as long as the shift lever 3 is placed in the reverse position.

Furthermore, a display device DSP is placed at a console panel of the vehicle 1. The display device DSP is used to display a current position of the vehicle or other map display in, for example, a navigation system.

A rear wiper device 6 is placed in a rear center position of the vehicle 1 at a lower side of a rear window glass 4. In the rear wiper device 6, when a rear wiper motor M1 is driven to rotate in response to manipulation of a rear wiper switch LSW that is provided to the driver's seat, a wiping movement (swing movement) of a wiper blade (also referred to as a rear wiper) 7 along an external surface of the rear window glass 4 is executed to wipe the external surface of the rear window glass 4.

A rear washer nozzle (also referred to as a rear window glass washer nozzle or simply referred to as a window glass washer nozzle) N1 is placed in the rear center position of the vehicle 1 at an upper side of the rear window glass 4. A nozzle opening (outlet) N1a of the rear washer nozzle N1 is directed to the rear window glass 4 located on a lower side of the nozzle opening N1a of the rear washer nozzle N1 to spray washer fluid over a wiping surface of the rear window glass 4 from the nozzle opening N1a of the rear washer nozzle N1.

A back monitor onboard camera 20 is placed at a rear outer side of the vehicle 1. The onboard camera 20 is placed at a rear outer side of the vehicle at a location, which is on a rear side of the rear wiper device 6. In the present embodiment, the onboard camera 20 is a rear view camera for monitoring a rear side (back side) of the vehicle 1. An image, which is captured by the onboard camera 20, is outputted as image data to the display device DSP placed at the console panel of the vehicle 1. The display device DSP displays the image, which is captured by the onboard camera 20, on a screen of the display device DSP based on image data of the captured image.

When the shift lever 3 of the transmission 2 is placed into the reverse position to place the vehicle in the reverse drive mode, the onboard camera 20 begins to capture the image and outputs the image data of the captured image to the display device DSP. Then, when the shift lever 3 is shifted from the reverse position to another position, which is other than the reverse position, the onboard camera 20 terminates the capturing of the image.

A camera washer nozzle N2 is provided at the rear outer side of the vehicle 1. The camera washer nozzle N2 is placed at a location, which is adjacent to the onboard camera 20 and is outside of a rear image capturing view angle of the onboard camera 20. A nozzle opening (outlet) N2a of the camera washer nozzle N2 is directed to one side of the onboard camera 20 where a lens 20b of the onboard camera 20 is located. More specifically, the nozzle opening N2a of the camera washer nozzle N2 is directed to a glass cover 20a, which is also referred to as a transparent protective cover and is provided at the one side of the onboard camera 20 in front of the lens 20b to protect the lens 20b of the onboard camera 20 from, for example, dirt, debris and/or dust. The washer fluid is sprayed from the nozzle opening N2a of the camera washer nozzle N2 over the glass cover 20a of the onboard camera 20.

The washer fluid, which is stored in a tank T placed in a front engine room (an upper portion in FIG. 1A) of the vehicle 1, is fed toward the rear washer nozzle N1 and the camera washer nozzle N2. Specifically, an electromagnetic pump P, which pumps washer fluid, is connected to the tank T. A base end portion (upstream end portion) of the main conduit 8 is connected to an outlet P1 of the electromagnetic pump P. The main conduit 8 is placed such that a distal end portion (rear end portion, i.e., downstream end portion) of the main conduit 8 extends to the rear side of the vehicle 1, and an inlet B1 of a switch valve (serving as a switching device) B is connected to the distal end portion of the main conduit 8.

A plurality of outlets of the switch valve B is connected to base end portions of a plurality of conduits. More specifically, first and second outlets B2, B3 of the switch valve B are connected to the base end portions of first and second conduits (serving as first and second branch passages, respectively) 9, 10, which are other than the main conduit 8. The base end portion (upstream end portion) of the first conduit 9 is connected to the first outlet B2 of the switch valve B, and the distal end portion (downstream end portion) of the first conduit 9 is connected to the rear washer nozzle N1. The distal end portion of the second conduit 10 is connected to the camera washer nozzle N2. The switch valve B includes, for example a spool valve and the solenoid coil. For instance, a controller (not shown) excites a solenoid coil in response to a position of the shift lever 3 to move the spool valve by the solenoid coil, so that the washer fluid, which is pumped by the electromagnetic pump P, is selectively fed to one of the rear washer nozzle N1 and the camera washer nozzle N2 through a corresponding flow passage of the switch valve B.

A control conduit (serving as a flow limiter) 11 is inserted into the second conduit 10. Specifically, the second conduit 10 includes a first auxiliary conduit (serving as a first conduit portion) 10a and a second auxiliary conduit (serving as a second conduit portion) 10b. A base end portion (upstream end portion) of the first auxiliary conduit 10a is connected to the second outlet B3 of the switch valve B, and a distal end portion (downstream end portion) of the first auxiliary conduit 10a is connected to the control conduit 11. A base end portion (upstream portion) of the second auxiliary conduit 10b is connected to the control conduit 11, and the camera washer nozzle N2 is connected to a distal end portion (downstream end portion) of the second auxiliary conduit 10b. In the present embodiment, flexible hoses of the same type are used to form the first conduit 9 and the first and second auxiliary conduits 10a, 10b of the second conduit 10. Therefore, inner diameters of the first conduit 9 and the first and second auxiliary conduits 10a, 10b of the second conduit 10 are generally equal to each other.

With reference to FIG. 1B, the control conduit 11 is made of resin (having a rigidity higher than that of the auxiliary conduits 10a, 10b) and is configured into a tubular form. An outer diameter of the control conduit 11 is generally the same as an outer diameter of the second conduit 10 (auxiliary conduits 10a, 10b). Two end portions of the control conduit 11 are formed as two connecting portions 11a, 11b, respectively, which are insertable into the auxiliary conduits 10a, 10b, respectively. An engaging ring 11c, 11d, which is adapted to be engaged with the corresponding auxiliary conduit 10a, 10b, is formed in each of the connecting portions 11a, 11b of the control conduit 11 to limit removal of the connecting portions 11a, 11b from the auxiliary conduits 10a, 10b.

A limiting flow passage 12 of the washer fluid, which is formed in the control conduit 11, is configured as follows. A constriction 12c is formed in a center part of the limiting flow passage 12 (a center part of the control conduit 11 in the flow direction of the washer fluid). A cross-sectional area, more specifically a minimum cross-sectional area (a cross-sectional area that is perpendicular to a flow direction of the washer fluid) of the constriction 12c is smaller than those of two openings 12a, 12b of the limiting flow passage 12, which are located at two ends, respectively, of the limiting flow passage 12. Furthermore, the limiting flow passage 12 is tapered such that the cross-sectional area of the limiting flow passage 12 is progressively decreased from each of the openings 12a, 12b toward the construction 12c.

Next, an operation of the washer system, which is constructed in the above described manner, will be described.

When the shift lever 3 of the transmission 2 is positioned in the other position, which is other than the reverse position, the switch valve B connects the first conduit 9 to the main conduit 8. That is, the switch valve B connects between the rear washer nozzle N1 and the solenoid pump P. Thus, normally, the rear washer nozzle N1 is placed into a feedable state, in which the washer fluid can be fed from the tank T by the solenoid pump P. In this feedable state, when a washer switch SW1, which is provided at the driver's seat side, is manipulated to an ON position thereof by the driver, the solenoid pump P is driven to feed the washer fluid from the tank T to the rear washer nozzle N1 through the main conduit 8 and the first conduit 9. Then, the washer fluid is sprayed from the nozzle opening N1a of the rear washer nozzle N1 over the rear window glass 4.

In contrast, when the shift lever 3 of the transmission 2 is positioned in the reverse position, the switch valve B connects the second conduit 10 to the main conduit 8. That is, the switch valve B connects between the camera washer nozzle N2 and the electromagnetic pump P. Thus, the camera washer nozzle N2 is placed into a feedable state, in which the washer fluid can be fed from the tank T by the solenoid pump P. In this feedable state, when the washer switch SW1, which is provided at the driver's seat side, is manipulated to the ON position by the driver, the solenoid pump P is driven to feed the washer fluid from the tank T to the camera washer nozzle N2 through the main conduit 8 and the second conduit 10. Thus, the washer fluid is sprayed from the nozzle opening of the camera washer nozzle N2 over the glass cover 20a of the onboard camera 20.

As discussed above, the washer fluid is supplied into the limiting flow passage 12 from the opening 12a of the connecting portion 11a, which is inserted into the first auxiliary conduit 10a. Then, the washer fluid is outputted from the opening 12b of the connecting portion 11b, which is inserted into the second auxiliary conduit 10b. Therefore, the opening 12a functions as an inlet, through which the washer fluid is supplied into the limiting flow passage 12, and the opening 12b functions as an outlet, through which the washer fluid is outputted from the limiting flow passage 12.

The passage cross-sectional area of the constriction 12c, which is formed in the center part of the limiting flow passage 12, is smaller than the opening cross-sectional area of the opening 12a, through which the washer fluid is supplied into the limiting flow passage 12. Therefore, as shown in FIG. 2A, a flow quantity of the washer fluid, which flows in the second auxiliary conduit 10b, is reduced in conformity with the cross-sectional area of the constriction 12c relative to the flow quantity of the washer fluid, which is fed through the first auxiliary conduit 10a. Here, it should be noted that FIG. 2A merely schematically illustrates the decrease of the flow quantity of the washer fluid through the control conduit 11. Specifically, in FIG. 2A, a linear section of a line of the graph, which indicates the change in the flow quantity of the washer fluid through the control conduit 11, is a line that connects between a value of the flow quantity of the washer fluid at the opening 12a and a value of the flow quantity of the washer fluid at the opening 12b and does not indicate changes in the flow quantity of the washer fluid at a location between the opening 12a and the opening 12b. This is also true for the rest of the line of the graph of FIG. 2A. That is, each linear section of FIG. 2A merely indicates a difference between the flow quantity of the washer fluid at the corresponding inlet and the flow quantity of the washer fluid at the corresponding outlet in the corresponding one of the conduits 10a, 10b and the nozzle N2.

Furthermore, the opening cross-sectional area of the opening 12b, through which the washer fluid is outputted from the limiting flow passage 12, is larger than the passage cross-sectional area of the constriction 12c of the limiting flow passage 12. Therefore, the cross-sectional area of the limiting flow passage 12, which feeds the washer fluid, is increased from the constriction 12c to the opening 12b in the supply direction (the flow direction) of the washer fluid. Thus, a flow speed of the washer fluid at the outlet (the opening 12b) becomes lower than a flow speed of the washer fluid at the inlet (the opening 12a).

As discussed above, the control conduit 11 reduces the flow quantity of the feeding washer fluid per unit time. Furthermore, the control conduit 11 reduces the flow speed of the feeding washer fluid.

The inner peripheral surface of the control conduit 11 is tapered such that the passage cross-sectional area is progressively decreased from the inlet (the opening 12a) toward the constriction 12c. Therefore, the flow quantity of the washer fluid, which passes through the limiting flow passage 12, is progressively reduced, and this change in the flow quantity is slow. Furthermore, the inner peripheral surface of the control conduit 11 is tapered such that the passage cross-sectional area progressively increases from the constriction 12c toward the outlet (the opening 12b). Therefore, the flow speed of the washer fluid, which passes through the limiting flow passage 12, is progressively reduced, and this change in the flow speed is slow. Thus, according to the present embodiment, generation of the washer fluid bubbles and noises can be reduced in comparison to a case where the passage cross-sectional area of the limiting flow passage 12 of the control conduit 11 is rapidly reduced to reduce the flow quantity.

The washer fluid, which is outputted from the control conduit 11, reaches the camera washer nozzle N2 through the second auxiliary conduit 10b shown in FIGS. 1A and 1B. As shown in FIG. 2A, in the camera washer nozzle N2 (simply indicated as "NOZZLE" in FIG. 2A), the flow quantity of the washer fluid is slowly reduced to a spray flow quantity of the washer fluid, which is sprayed over the onboard camera 20.

Figure 2B:
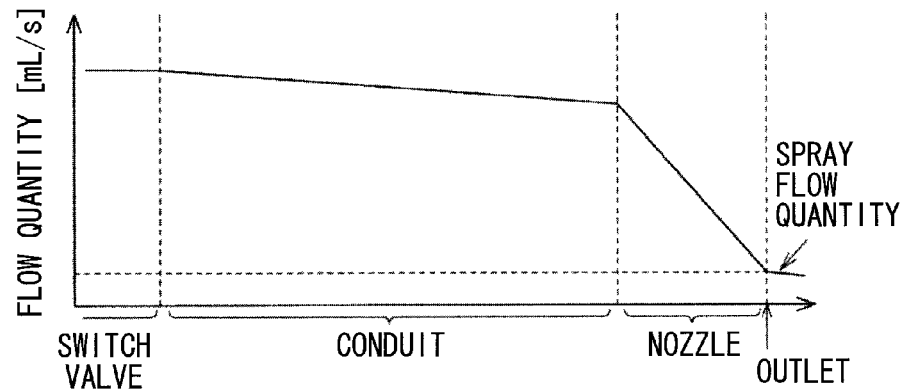
FIG. 2B is a diagram showing characteristics of a flow quantity of a washer system of a comparative example.

A method of limiting the spray flow quantity may be one shown in FIG. 2B where the flow quantity of the washer fluid, which is fed from the switch valve B, is reduced to the required spray flow quantity only by the camera washer nozzle. In such a case, the flow quantity of the washer fluid is rapidly changed at the camera washer nozzle. Then, a rapid change occurs between the volume of the washer fluid before the spraying of the washer fluid and the volume of the washer fluid after the spraying, so that the flow disturbance and/or the washer fluid bubbles are generated. The washer fluid bubbles may adhere to the onboard camera and may cause distortion of the captured image, which is captured by the onboard camera, thereby possibly resulting in the reduced visibility of the image.

In contrast, in the washer system of the present embodiment, the flow quantity of the washer fluid is reduced to the required spray flow quantity through the two stages of the control conduit 11 and the camera washer nozzle N2. Therefore, in this washer system, the change between the volume of the washer fluid before the spraying of the washer fluid and the volume of the washer fluid after the spraying is smaller in comparison to the case where the flow quantity of the washer fluid is reduced to the required spray flow quantity through the camera washer nozzle N2. In addition, the generation of the flow disturbance and the washer fluid bubbles is limited. As a result, the image of the good visibility can be obtained at the onboard camera 20 by limiting the generation of the washer fluid bubbles.

As discussed above, the present embodiment provides the following advantages.

(1) The washer fluid, which is stored in the tank T of the vehicle 1, is pumped to the switch valve B by the solenoid pump P. The switch valve B selectively feeds the pumped washer fluid to one of the rear washer nozzle N1 and the camera washer nozzle N2. The control conduit 11 is provided in the second conduit 10, which connects between the switch valve B and the camera washer nozzle N2. The flow quantity of the washer fluid, which is fed to the camera washer nozzle N2, is limited by the control conduit 11.

Therefore, the washer fluid, which is pumped by the single solenoid pump P, is selectively fed to one of the rear washer nozzle N1 and the camera washer nozzle N2 by the switch valve B. Furthermore, the control conduit 11 is provided in the second conduit 10, which connects between the switch valve B and the camera washer nozzle N2, and the control conduit 11 limits the flow quantity of the washer fluid. Even if the flow quantity of the washer fluid, which is pumped by the solenoid pump P, is set according to the rear washer nozzle N1 that has the relatively large spray flow quantity, the washer fluid, the flow quantity of which is limited by the control conduit 11, can be fed to the washer nozzle N2 that has the relatively small spray flow quantity. As discussed above, the washer fluid of the flow quantity, which corresponds to the onboard camera 20, is fed to the camera washer nozzle N2, so that it is possible to limit the waste of the washer fluid.

(2) The washer fluid is supplied into the limiting flow passage 12 of the control conduit 11 through the opening (inlet) 12a and is outputted from the limiting flow passage 12 through the opening 12b (outlet). The cross-sectional area (and thereby the inner diameter) of the constriction 12c, which is located between the opening 12a and the opening 12b, is set to be smaller than those (opening diameters) of the openings 12a, 12b. Therefore, the flow quantity of the washer fluid, which is fed through the constriction 12c of the control conduit 11, can be easily changed by changing the cross-sectional area of the constriction 12c. Furthermore, since the control conduit 11 has the simple structure, the flow quantity of the washer fluid can be changed at the low costs.

(3) The limiting flow passage 12 is tapered from the opening (the inlet) 12a to the constriction 12c. Therefore, a restricting force, such as a frictional force, acts gradually on the washer fluid in the limiting flow passage 12, and thereby it is possible to limit the generation of the washer fluid bubbles.

(4) The limiting flow passage 12 is tapered from the opening (the outlet) 12b to the constriction 12c. Therefore, a change in the volume of the washer fluid from the upstream side of the constriction 12c to the downstream side of the constriction 12c becomes slow, and thereby it is possible to limit generation of the washer fluid bubbles and generation of turbulence in the flow of the washer fluid.

(5) The control conduit 11 is connected to the switch valve B through the first auxiliary conduit 10a and is also connected to the camera washer nozzle N2 through the second auxiliary conduit 10b. Therefore, replacement of the control conduit 11 is relatively easy, and it is possible to change the flow quantity of the washer fluid without replacing the camera washer nozzle N2 and/or the switch valve B.

(6) The outer diameter of the control conduit 11 is generally the same as the outer diameter of the second conduit 10 (and thereby of the first and second auxiliary conduits 10a, 10b). Therefore, there is the reduced number of limitations on the location of the control conduit 11, and thereby it is possible to place the control conduit 11 at any desired location between the switch valve B and the camera washer nozzle N2.

(7) The control conduit 11 is inserted into and is connected to the second conduit 10, which feeds the washer fluid from the switch valve B to the camera washer nozzle N2. Thereby, it is possible to limit an increase in the size of the switch valve B and/or the camera washer nozzle N2, and thus it is possible to minimize the limitations on the conduit positioning and the conduit assembling. Furthermore, the conduit positioning and the conduit assembling can be easily made.

The above embodiment of the present disclosure may be modified as follows.

The flow quantity of the washer fluid, which passes through the control conduit, may be changed to any appropriate value.

Figure 3:
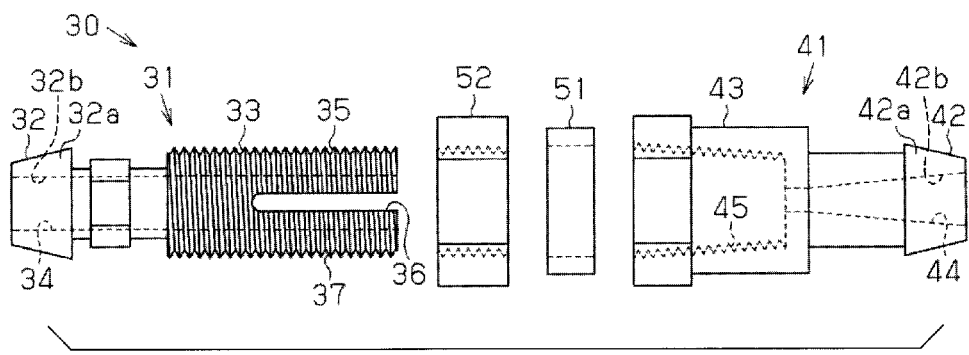
FIG. 3 is an exploded side view showing a first modification of a control conduit of the washer system of the embodiment.

The control conduit 11 of the above embodiment may be replaced with, for example, a control conduit (serving as a flow limiter) 30 shown in FIG. 3. The control conduit 30 includes a first housing 31 and a second housing 41, each of which is configured into a tubular form.

One end portion (the left end portion in FIG. 3) of the first housing 31 is formed as a first connecting portion 32, which has an opening (serving as an inlet) 32b and is adapted to be inserted into the first auxiliary conduit 10a shown in FIGS. 1A and 1B. Furthermore, the other end portion (the right end portion in FIG. 3) of the first housing 31 is formed as a first adjusting portion 33, which is adapted to be inserted into the second housing 41. One end portion (the right end portion in FIG. 3) of the second housing 41 is formed as a second connecting portion 42, which has an opening (serving as an outlet) 42b, and is adapted to be inserted into the second auxiliary conduit 10b shown in FIGS. 1A and 1B. Furthermore, the other end portion (the left end portion in FIG. 3) of the second housing 41 is formed as a second adjusting portion 43, which is adapted to be engaged with an outer peripheral part of the first adjusting portion 33 of the first housing 31.

An engaging ring 32a is formed in the first connecting portion 32 of the first housing 31 to engage with the first auxiliary conduit 10a and to limit removal of the first auxiliary conduit 10a from the first connecting portion 32. Similarly, an engaging ring 42a is formed in the second connecting portion 42 of the second housing 41 to engage with the second auxiliary conduit 10b and to limit removal of the second auxiliary conduit 10b from the second connecting portion 42.

Figure 4A:
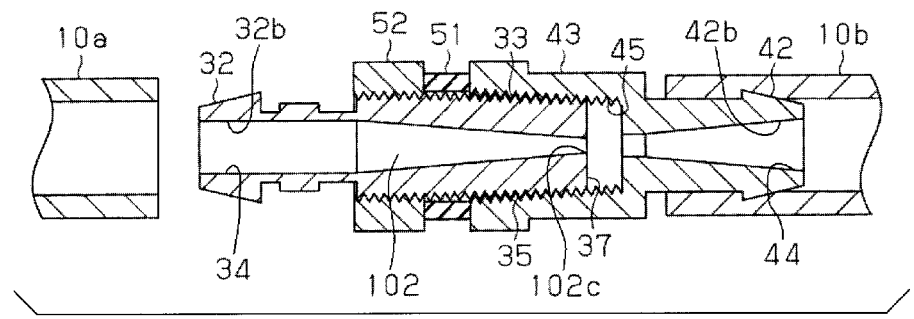
FIG. 4A is a cross-sectional view showing one state of the control conduit shown in FIG. 3 upon assembling thereof.
Figure 4B:
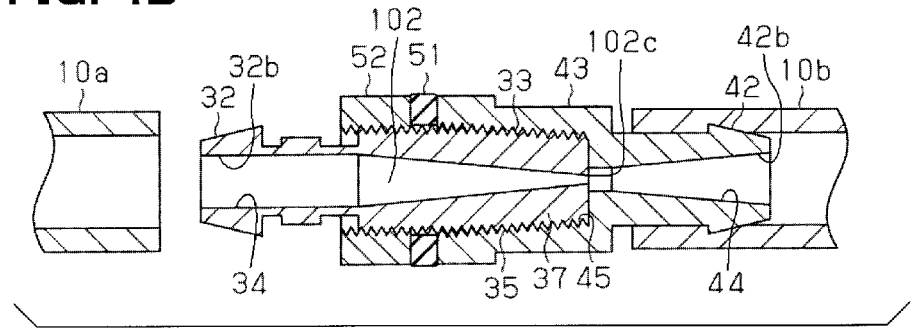
FIG. 4B is a cross-sectional view showing another state of the control conduit shown in FIG. 3 upon assembling thereof.

In the first housing 31, a cross-sectional area of an upstream section of a flow passage (a first flow passage) 34, which is located in the first connecting portion 32, is generally constant along an entire length of the upstream section of the flow passage 34 in the flow direction of the washer fluid. A downstream section of the flow passage 34, which is located in the first adjusting portion 33, is also generally constant before the assembling of the control conduit 30. However, when the first adjusting portion 33 is inserted into the second adjusting portion 43, the downstream section of the flow passage 34, which is located in the first adjusting portion 33, is tapered such that a cross-sectional area of the downstream section of the flow passage 34 in the first adjusting portion 33 is progressively reduced from the connecting portion 32 side thereof toward a distal end (a downstream end) of the downstream section of the flow passage 34 (toward the right end in FIG. 3), as shown in FIGS. 4A and 4B. In the second housing 41, a flow passage (a second flow passage) 44 of the second connecting portion 42 is tapered such that a cross-sectional area of the flow passage 44 is progressively increased toward a distal end, i.e., a downstream end (the right end in FIG. 3) of the flow passage 44. The flow passages 34, 44 form a limiting flow passage 102, and a constriction 102c, which is similar to the constriction 12c of the above embodiment, is formed in the limiting flow passage 102 between the opening 32b and the opening 42b. However, in this modification, a cross-sectional area (inner diameter) of the constriction 102c is variable depending on a relative position between the first housing 31 and the second housing 41, as described below.

A male thread 35 is formed in an outer peripheral surface of the first adjusting portion 33. A plurality (e.g., four) of slits 36 is formed in the first adjusting portion 33 to extend from a distal end, i.e., a downstream end toward a proximal end, i.e., an upstream end of the first adjusting portion 33. The slits 36 divide a distal end part (a right end part in FIG. 3) of the first adjusting portion 33 into a plurality (e.g., four) of adjusting claws 37, which are arranged one after another in a circumferential direction. The first housing 31 is made of a flexible material (e.g., resin), which enables flexing of each adjusting claw 37 in the radial direction.

An inner peripheral surface of the second adjusting portion 43, which is configured into a cylindrical tubular form, is formed such that an inner diameter of the second adjusting portion 43 is progressively increased toward an opening end (a left end in FIG. 3) thereof, and an inner diameter of the opening end of the second adjusting portion 43 is generally the same as an outer diameter of the first adjusting portion 33. Furthermore, a female thread 45 is formed in the inner peripheral surface of the second adjusting portion 43 to threadably engage with the male thread 35, which is formed in the outer peripheral surface of the first adjusting portion 33. Therefore, the first housing 31 and the second housing 41 are constructed such that the relative position (the relative position in the flow direction of the washer fluid) between the first housing 31 and the second housing 41 is changeable through relative movement (relative rotation) between the first adjusting portion 33 and the second adjusting portion 43.

An O-ring 51 is outfitted to the first adjusting portion 33. A fixing member 52 is fitted to the male thread 35, which is formed in the outer peripheral surface of the first adjusting portion 33. The O-ring 51 is clamped between the fixing member 52 and the opening end of the second housing 41 to fluid-tightly seal between the first adjusting portion 33 and the second adjusting portion 43. The fixing member 52 exerts a frictional force between the O-ring 51 and the first adjusting portion 33, so that relative rotation between the first adjusting portion 33 and the second adjusting portion 43, i.e., relative movement between the first housing 31 and the second housing 41 is limited.

The control conduit 30 is held such that the first adjusting portion 33 is threadably fitted into the second adjusting portion 43 of the second housing 41, as shown in FIGS. 4A and 4B. The inner peripheral surface of the second adjusting portion 43 is formed such that the inner diameter of the second adjusting portion 43 is progressively increased toward the opening end (the left end in FIG. 3) of the second adjusting portion 43. Therefore, each adjusting claw 37 of the first adjusting portion 33 is radially inwardly urged by the inner peripheral surface of the second adjusting portion 43 toward a center of the first adjusting portion 33. Thus, when the relative position between the first housing 31 and the second housing 41 is changed, a cross-sectional area of the flow passage 34, which is formed in the first adjusting portion 33, is changed, and the cross-sectional area of the constriction 102c is also changed. The cross-sectional area of the flow passage 34 corresponds to the amount of insertion of the first adjusting portion 33 into the second adjusting portion 43, i.e., corresponds to the relative position between the first adjusting portion 33 and the second adjusting portion 43 (i.e., the relative position between the first housing 31 and the second housing 41). As discussed above, the cross-sectional area of the flow passage 34 (and the cross-sectional area of the constriction 102c), i.e., the flow quantity of the washer fluid, which passes through the control conduit 30, can be easily changed by changing the relative position between the first housing 31 and the second housing 41. The first adjusting portion 33 and the second adjusting portion 43 serve as a flow quantity adjusting means.

As shown in FIG. 4B, when the fixing member 52 is threadably tightened to compress the O-ring 51, a resilient force of the O-ring 51 is exerted against the first housing 31 in a counter-inserting direction of the first housing 31, which is opposite from the inserting direction of the first housing 31 into the fixing member 52 and the second adjusting portion 43. Therefore, the resilient force, which is exerted to the first housing 31, limits the relative rotation between the first housing 31 and the second housing 41, i.e., a change in the relative position between the first housing 31 and the second housing 41. In this way, it is possible to limit the change in the relative position between the first housing 31 and the second housing 41 caused by, for example, vibrations of the vehicle.

The spray flow quantity of the washer fluid at the camera washer nozzle N2 shown in FIG. 1A can be adjusted by changing the flow quantity of the washer fluid, which passes through the control conduit 30.

Figure 5A:
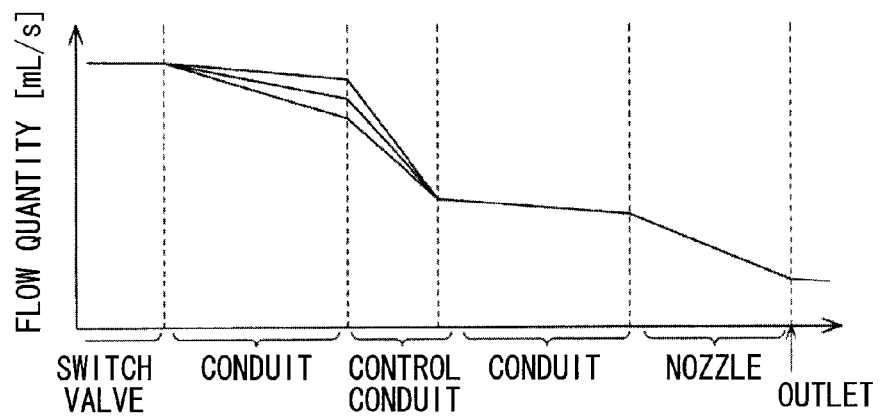
FIG. 5A is a diagram showing characteristics of a flow quantity in the first modification of the washer system of the embodiment.
Figure 5B:
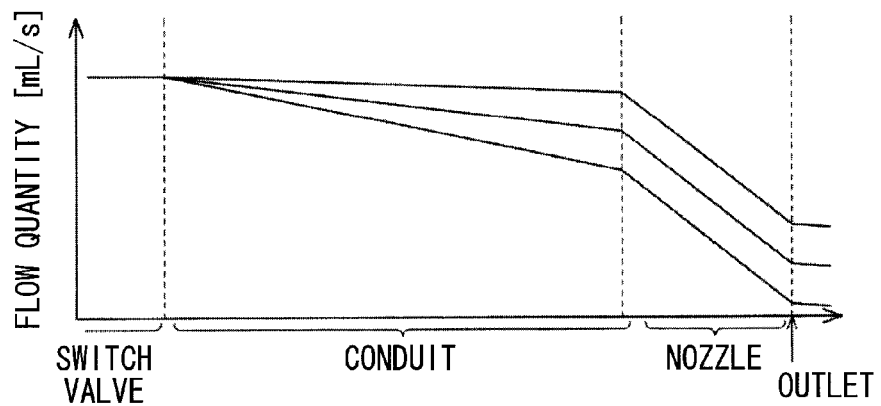
FIG. 5B is a diagram showing characteristics of a flow quantity in the comparative example.

As shown in FIG. 1A, the washer fluid is stored in the tank T provided in the front engine room of the vehicle 1 and is pumped by the electromagnetic pump P. The washer fluid is fed to the camera washer nozzle N2, which is provided at the rear side of the vehicle 1, through the main conduit 8. The main conduit 8 is placed in an inside of a ceiling portion of the vehicle 1. Therefore, a height difference between the electromagnetic pump P and the ceiling portion of the vehicle 1 is a differential pump head. This differential pump head varies depending on a model, i.e., a type of the vehicle (vehicle type). Therefore, in a case where the electromagnetic pump P having the same pumping force is used in different types of vehicles, a change in the flow quantity in the conduit varies among the different types of vehicles, as shown in FIG. 5B, which indicates a change in the flow quantity measured at three different vehicles. Therefore, the spray flow quantity of the washer fluid at the camera washer nozzle N2 varies among the different types of vehicles.

The change in the flow quantity of the washer fluid discussed above may occur depending on the state of the main conduit 8 installed in the vehicle. In a case of the vehicle having a long main conduit 8 installed therein, a change in the flow quantity (a hose loss) may occur. Furthermore, when a pressure of some kind is applied to the main conduit 8, which is installed in the vehicle, the cross-sectional area of the main conduit 8 may change (becomes smaller) to cause a change in the flow quantity.

In contrast, when the control conduit 30 shown in FIG. 3 is used, the flow quantity of the washer fluid can be adjusted at the control conduit 30. Therefore, as shown in FIG. 5A, even in the case where the change in the flow quantity of the washer fluid occurs in the conduit (the first auxiliary conduit 10a shown in FIGS. 1A and 1B) between the switch valve B and the control conduit 30, the flow quantity of the washer fluid at the camera washer nozzle N2 can be made generally constant among the different types of vehicles by adjusting the flow quantity of the washer fluid, which passes through the control conduit 30. As discussed above, when the control conduit 30, which can adjust the flow quantity of the washer fluid, is used, the flow quantity of the washer fluid supplied to the camera washer nozzle N2 can be set to a desired flow quantity. Therefore, even in the case where the change in the flow quantity of the washer fluid and/or the differential pump head occurs due to the difference(s) in the conduit(s) among the different types of vehicles, it is possible to easily adjust the flow quantity of the washer fluid. Furthermore, when multiple control conduits 30 are respectively used for different washing subjects (e.g., a door mirror, a headlamp), the flow quantity of the washer fluid can be adjusted at each control conduit 30 according to a desired spray flow quantity, which is set for each corresponding washing subject.

The structure of the control conduit may be modified in any appropriate manner.

Figure 6A:
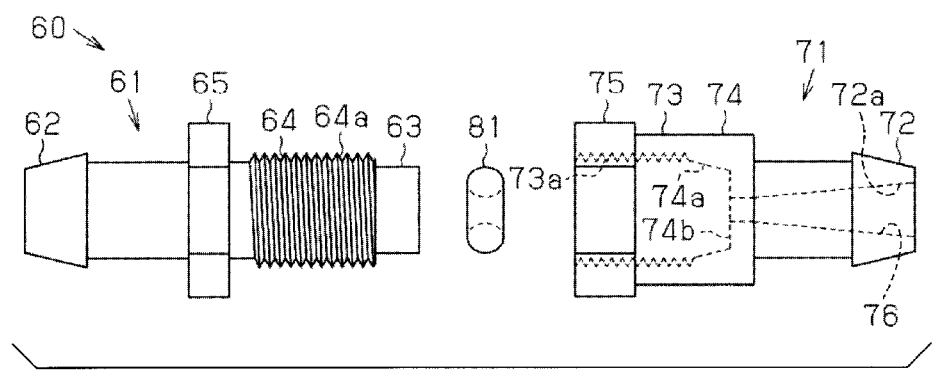
FIG. 6A is an exploded side view of a control conduit of a second modification of the embodiment.
Figure 6B:
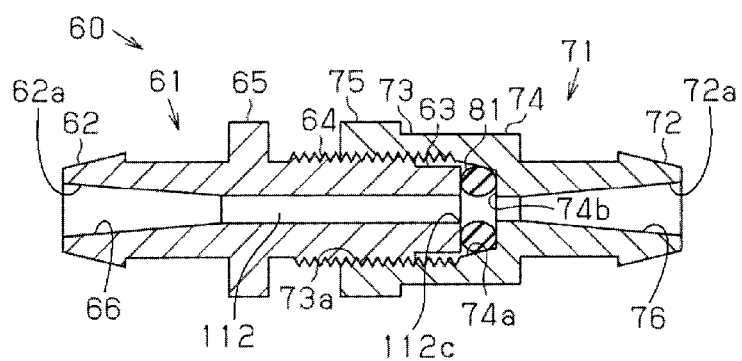
FIG. 6B is a diagram showing a state of the control conduit shown in FIG. 6A upon assembling thereof.

For instance, the structure of the control conduit may be modified to a control conduit (serving as a flow limiter) 60 shown in FIGS. 6A and 6B. The control conduit 60 includes a first housing 61 and a second housing 71, each of which is configured into a tubular form.

The first housing 61 includes a first connecting portion 62, a first flow quantity adjusting portion 63 and a first position adjusting portion 64. The first connecting portion 62 is formed in one end portion (a left end portion in FIG. 6A) of the first housing 61 and has an opening (serving as an inlet) 62a. The first flow quantity adjusting portion 63 is formed in the other end portion (a right end portion in FIG. 6A) of the first housing 61. The first position adjusting portion 64 is formed between the first connecting portion 62 and the first flow quantity adjusting portion 63. The first connecting portion 62 is formed in a manner similar to that of the first connecting portion 32 shown in FIG. 3. A male thread 64a is formed in an outer peripheral surface of the first position adjusting portion 64. The first flow quantity adjusting portion 63 is configured into a cylindrical form and is made of a resiliently deformable material (e.g., resin), which is resiliently deformable by an external force. A first manipulatable portion 65 is formed between the first connecting portion 62 and the first position adjusting portion 64 to enable adjustment described below. The first manipulatable portion 65 is configured into a hexagonal shape in an axial view taken from the first connecting portion 62 side.

The second housing 71 includes a second connecting portion 72, a second position adjusting portion 73 and a second flow quantity adjusting portion 74. The second connecting portion 72 is formed in one end portion (a right end portion in FIG. 6A) of the second housing 71 and has an opening (serving as an outlet) 72a. The second position adjusting portion 73 is formed in the other end portion (a left end portion in FIG. 6A) of the second housing 71. The second flow quantity adjusting portion 74 is formed between the second connecting portion 72 and the second position adjusting portion 73. The second connecting portion 72 is formed in a manner similar to that of the second connecting portion 42 shown in FIG. 3. The second position adjusting portion 73 is configured into a cylindrical tubular form and has a generally constant inner diameter along a length of the second position adjusting portion 73. A female thread 73a is formed in an inner peripheral surface of the second position adjusting portion 73 to engage with the male thread 64a of the first position adjusting portion 64. The second flow quantity adjusting portion 74 has an inner peripheral surface 74a, which is tapered such that an inner diameter of the second flow quantity adjusting portion 74 progressively increases toward the first flow quantity adjusting portion 63 side of the second flow quantity adjusting portion 74. Furthermore, the second flow quantity adjusting portion 74 includes an engaging side wall 74b. A flow passage of a predetermined diameter is formed through a center of the engaging side wall 74b. A second manipulatable portion 75, which is configured into a hexagonal shape similar to the hexagonal shape of the first manipulatable portion 65, is formed in an outer peripheral area of a distal end part (a left end part in FIG. 6A) of the second position adjusting portion 73.

The control conduit 60 includes an O-ring 81. As shown in FIG. 6B, the O-ring 81 is placed between a distal end surface of the first flow quantity adjusting portion 63 and the engaging side wall 74b.

In the control conduit 60, which is constructed in the above-described manner, relative position between the first housing 61 and the second housing 71 can be changed by threadably inserting the first position adjusting portion 64 into the second position adjusting portion 73 through relative rotation between the first manipulatable portion 65 and the second manipulatable portion 75 that is achieved by using a tool, such as a spanner (wrench). A distal end part of the first flow quantity adjusting portion 63 is engaged with the inner peripheral surface 74a of the second flow quantity adjusting portion 74, and the distal end part of the first flow quantity adjusting portion 63 is radially inwardly urged by the tapered inner peripheral surface 74a of the second flow quantity adjusting portion 74 to reduce an inner diameter of the distal end part of the first flow quantity adjusting portion 63. In this way, a cross-sectional area of a flow passage 66 (and thereby a cross-sectional area of a constriction 102c discussed below), which is formed in the first flow quantity adjusting portion 63, is reduced, and thereby the flow quantity of the washer fluid, which passes through the control conduit 60, is changed. The first flow quantity adjusting portion 63 and the second flow quantity adjusting portion 74 serve as a flow quantity adjusting means.

The O-ring 81, which is placed between the distal end surface of the first flow quantity adjusting portion 63 and the engaging side wall 74b, is resiliently deformed between the distal end surface of the first flow quantity adjusting portion 63 and the engaging side wall 74b to limit leakage of the washer fluid. That is, the first housing 61 and the second housing 71 are fluid-tightly connected with each other. Similar to the case of using the control conduit 30 discussed above, the flow quantity of the washer fluid, which is supplied to the camera washer nozzle N2, can be adjusted to the desired flow quantity, i.e., the spray flow quantity of the camera washer nozzle N2 can be adjusted to the desired flow quantity by using the control conduit 60. The flow passage (serving as a first flow passage) 66 extends from the opening 62a through the first housing 61, and a flow passage (serving as a second flow passage) 76 extends from the opening 72a through the second housing 71. The flow passage 66 and the flow passage 76 form a limiting flow passage 112 between the opening (inlet) 62a and the opening (outlet) 72a, and the constriction 112c, which is similar to the constriction 12c of the above embodiment or the constriction 102c of the above modification, is formed in the limiting flow passage 112 between the opening 62a and the opening 72a.

In the control conduit 30 of FIG. 3 and the control conduit 60 of FIG. 6, the portions (the adjusting portions 33, 43, the flow quantity adjusting portion 63, 74), which adjust the flow quantity of the washer fluid, are formed integrally with the housings 31, 41, 61, 71. Alternatively, a separate member may be inserted between the first housing and the second housing to adjust the flow quantity of the washer fluid.

Also, the connections of the control conduit 30, 60 may be reversed. For example, in the control conduit 30 shown in FIG. 3, the connecting portion 32 of the first housing 31 may be connected to the second auxiliary conduit 10b, and the second connecting portion 42 of the second housing 41 may be connected to the first auxiliary conduit 10a. Even when the connections of the control conduit 30 are changed in this manner, the advantages, which are similar to those discussed above, can be achieved.

In the above embodiment, the single control conduit 11 is placed between the switch valve B and the camera washer nozzle N2. Alternatively, a plurality of control conduits may be placed between the switch valve B and the camera washer nozzle N2. The flow quantity of the washer fluid may be changed in a stepwise manner by these control conduits. In this way, the flow quantity of the washer fluid, which is supplied to the camera washer nozzle N2, can be easily controlled by adjusting the number of the control conduits. Furthermore, the flow quantity of the washer fluid, which is supplied to the camera washer nozzle N2, can be adjusted to the desired flow quantity by changing the number of the control conduits according to the required adjusting amount of the flow quantity of the washer fluid at the conduit(s), which is required in view of the change in the flow quantity in the conduit(s) and/or the differential pump head. Therefore, even in the case where the change in the flow quantity of the washer fluid and/or the differential pump head occurs due to the use of the different conduit(s) among the different types of vehicles, the adjustment of the flow quantity of the washer fluid can be easily made. Furthermore, when the control conduits 30 are respectively used for the different washing subjects (e.g., the door mirror, the headlamp), the flow quantity of the washer fluid can be adjusted at each control conduit 30 according to the desired spray flow quantity, which is set for each corresponding washing subject.

In the above embodiment, the control conduit 11 is inserted into and is connected to the second conduit 10, which feeds the washer fluid from the switch valve B to the camera washer nozzle N2. However, the location of the control conduit 11 is not limited to this one. That is, the control conduit 11 may be placed in any location in the flow path (the flow path including the flow passage of the switch valve B, the second conduit 10, and the flow passage of the camera washer nozzle N2) between the inlet B1 of the switch valve B and the nozzle opening (outlet) N2a of the camera washer nozzle N2 to limit the flow quantity of the washer fluid, which is fed from the switch valve B to the nozzle opening N2a of the camera washer nozzle N2 shown in FIG. 1A.

For instance, the control conduit 11 may be formed integrally with the camera washer nozzle N2 or may be formed integrally with the switch valve B. Here, the integral formation of the control conduit 11 refers to the integration of the control conduit 11 in the camera washer nozzle N2 or the switch valve B. Furthermore, in the cases of the first modification shown in FIGS. 3 to 4B or the second modification shown in FIGS. 6A and 6B, only one of the first and second housings 31, 41, 61, 71 may be non-rotatably fixed to the camera washer nozzle N2 or the switch valve B, and the other one of the first and second housings 31, 41, 61, 71 may be rotatably connected to the one of the first and second housings 31, 41, 61, 71 to enable the adjustment of the flow quantity of the washer fluid through the control conduit 30, 60.

Figure 7A:
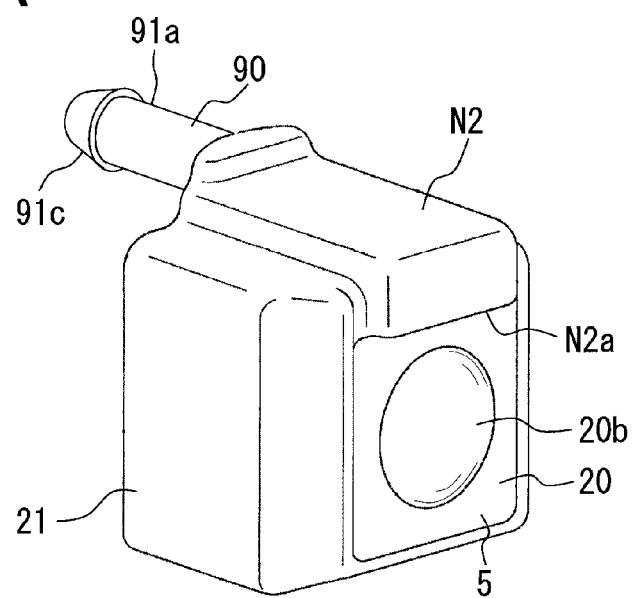
FIG. 7A is a perspective view showing an onboard camera together with a camera washer nozzle in a third modification of the embodiment.
Figure 7B:
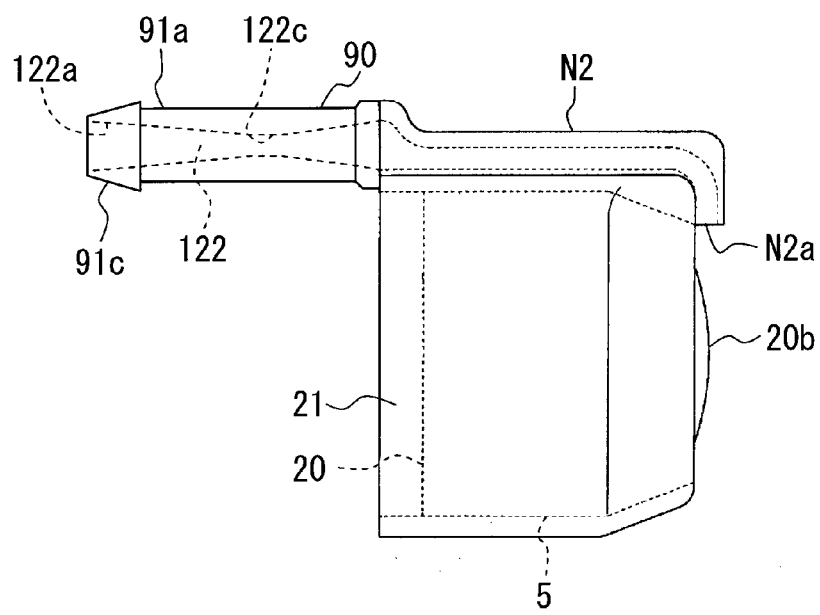
FIG. 7B is a side view showing the onboard camera together with the camera washer nozzle in the third modification.

For example, as shown in FIGS. 7A and 7B, which show a third modification of the embodiment, a control conduit (flow limiter) 90 may be formed integrally with the camera washer nozzle N2 as a connection conduit of the camera washer nozzle N2. The control conduit 90, i.e., the connection conduit of the nozzle N2 may be integrally molded together with the rest of the nozzle N2. Alternatively, the control conduit 90 may be molded separately from a main body of the camera washer nozzle N2 and then may be joined to the main body of the camera washer nozzle N2 by, for example, a bonding material, mechanical engagement or a mechanical fixing element(s). In this instance, the nozzle N2 is held by a housing 21. The housing 21 is securely installed to the body of the vehicle 1 and receives a case 5 of the onboard camera 20. In FIGS. 7A and 7B, the glass cover 20a of the above embodiment is eliminated, and the lens (convex lens) 20b is directly exposed from the case 5. Alternatively, the glass cover 20a of the above embodiment may be provided on a front side of the lens 20b to protect the lens 20b like in the case of the above embodiment. In such a case, the lens 20b may be recessed away from the surface of the case 5, and the glass cover 20a may cover the lens 20b.

The control conduit 90 has a connecting portion 91a, which has an opening (serving as an inlet) 122a and is adapted to be inserted into the second conduit 10 through an engaging ring 91c. In this instance, unlike the above embodiment, the second conduit 10 is not divided into the auxiliary conduits 10a, 10b. That is, the second conduit 10 is formed as a single conduit to extend continuously from the switch valve B to the connecting portion 91a. Similar to the limiting flow passage 12 of the above embodiment, a limiting flow passage 122 extends through the control conduit 90 and is communicated with the nozzle opening N2a to supply the washer fluid thereto. A constriction 122c, which is similar to the constriction 12c of the above embodiment, is formed in the limiting flow passage 122 on the downstream side of the opening 122a. The limiting flow passage 122 is tapered such that the inner diameter of the limiting flow passage 122 is progressively decreased from the opening 122a side toward the constriction 122c. Also, the limiting flow passage 122 is tapered such that the inner diameter of the limiting flow passage 122 is progressively increased from the constriction 122c toward the downstream side (i.e., toward a downstream end of the control conduit 90, which forms an outlet of the limiting flow passage 122). Furthermore, in this instance, the second conduit 10 and the control conduit 90, i.e., the connection conduit of the nozzle N2 serve as a branch passage, which is branched at the switch valve B and extends to the nozzle opening N2a through the nozzle N2.

Figure 8:
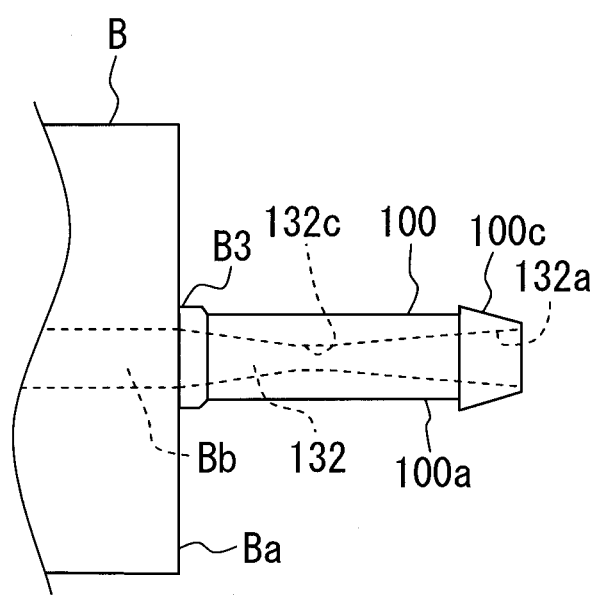
FIG. 8 is a partial view showing a switch valve in a fourth modification of the embodiment.

Furthermore, as shown in FIG. 8, which shows a fourth modification of the embodiment, a control conduit (flow limiter) 100 may be formed integrally with a housing Ba of the switch valve B at the second outlet B3 as a connection conduit of the housing Ba of the switch valve B. The control conduit 100, i.e., the connection conduit of the switch valve B may be integrally molded together with the rest of the housing Ba of the switch valve B. Alternatively, the control conduit 100 may be molded separately from a main body of the housing Ba of the switch valve B and then may be joined to the main body of the housing Ba of the switch valve B by, for example, a bonding material, mechanical engagement or a mechanical fixing element(s). The control conduit 100 has a connecting portion 100a, which has an opening (serving as an outlet) 132a and is adapted to be inserted into the upstream end portion of the second conduit 10, which is formed as the single conduit like in the case of the third modification, to supply the washer fluid received from the pump P to the nozzle N2 through the flow passage Bb of the switch valve B. Similar to the limiting flow passage 12 of the above embodiment or the limiting flow passage 122 of FIGS. 7A and 7B, a limiting flow passage 132 extends through the control conduit 100 and is communicated with the opening 132a. A constriction 132c, which is similar to the constriction 12c of the above embodiment or the constriction 122c of FIGS. 7A and 7B, is formed in the limiting flow passage 132. The limiting flow passage 132 is tapered such that the inner diameter of the limiting flow passage 132 is progressively decreased from an upstream end (serving as a limiting flow passage's inlet) side of the control conduit 100 toward the constriction 132c. Also, the limiting flow passage 132 is tapered such that the inner diameter of the limiting flow passage 132 is progressively increased from the constriction 132c toward the downstream side. Furthermore, in this instance, the control conduit 100, i.e., the connection conduit of the switch valve B and the second conduit 10 serve as a branch passage, which is branched at the switch valve B to feed the washer fluid to the nozzle N2. With the integral formation of the control conduit 11 with the switch valve B or the camera washer nozzle N2, the installation of the control conduit 11 can be eased.

Figure 9:
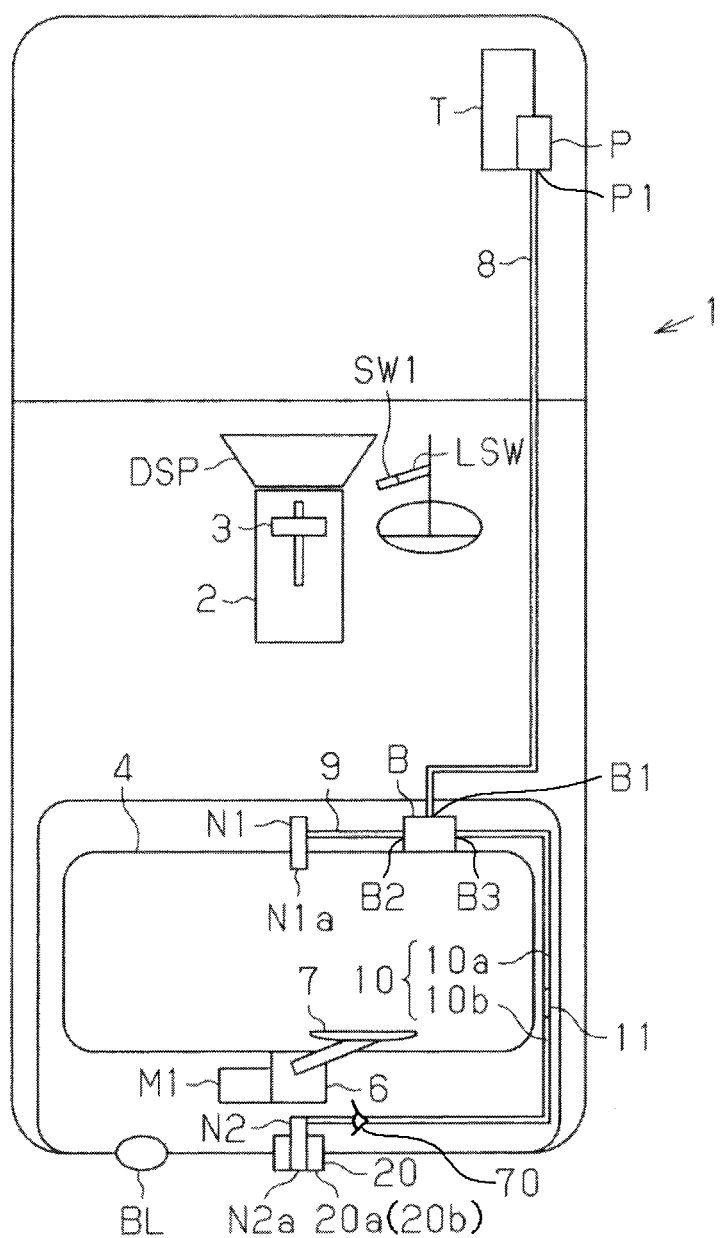
FIG. 9 is a schematic diagram of a vehicle having a washer system of a fifth modification of the embodiment.

Furthermore, as shown in FIG. 9, which shows a fifth modification of the embodiment, a check valve 70 may be placed on the downstream side of the control conduit 11 (more specifically, on the downstream side of the constriction 12c) in the flow direction of the washer fluid in the flow path (the second auxiliary conduit 10b in the case of FIG. 9) between the inlet B1 of the switch valve B and the nozzle opening (outlet) N2a of the camera washer nozzle N2. The check valve 70 disables flow of the washer fluid (and the air) from a downstream side (nozzle N2 side) of the check valve 70 to an upstream side (control conduit 11 side) of the check valve 70 through the check valve 70. In contrast, the check valve 70 enables flow of the washer fluid from the upstream side of the check valve 70 to the downstream side of the check valve 70 through the check valve 70.

Next, an advantage of the check valve 70 will be described. For the descriptive purpose, it is now assumed that the interior of the control conduit 11 is not filled with the washer fluid but is filled with the air before the time of starting the spraying of the washer fluid through the camera washer nozzle N2. In such a case, the air, which is present in the control conduit 11, may be mixed into the washer fluid on the downstream side of the constriction 12c of the control conduit 11 due to creation of a turbulent flow of the washer fluid on the downstream side of the constriction 12c caused by the accelerated high flow speed of the washer fluid at the constriction 12c of the control conduit 11 upon driving of the pump P. When the air is mixed into the washer fluid, the washer fluid, which is sprayed from the camera washer nozzle N2 onto the glass cover 20a of the onboard camera 20, forms the washer fluid bubbles on the glass cover 20a. The washer fluid bubbles will interfere with the capturing of the clear view through the onboard camera 20. However, when the check valve 70 of the present modification is placed on the downstream side of the control conduit 11, it is possible to hold the washer fluid in the space of the second auxiliary conduit 10b between the control conduit 11 and the check valve 70 by limiting the flow of the air through the check valve 70 toward the control conduit 11. Thus, intrusion of the air into the interior of the control conduit 11 through the nozzle opening N2a and the second auxiliary conduit 10b can be advantageously limited. As a result, the mixing of the air into the washer fluid discussed above can be advantageously limited at the time of starting the spraying of the washer fluid through the camera washer nozzle N2. Thereby, it is possible to capture the clear view through the onboard camera 20.

In FIG. 9, the check valve 70 is placed in the second auxiliary conduit 10b between the control conduit 11 and the camera washer nozzle N2. However, the location of the check valve 70 is not limited to this. For instance, the check valve 70 may be integrated in the camera washer nozzle N2. For instance, the check valve 70 may be placed at a location that is on a downstream side of the constriction 122c in the camera washer nozzle N2 of FIG. 7B. Alternatively, the check valve 70 may be integrated in the control conduit 100 of the switch valve B of FIG. 8 at a location, which is on a downstream side of the constriction 132c. Even with such modifications, the advantage, which is discussed above with reference to FIG. 9, can be achieved. Furthermore, in the case where the multiple control conduits are placed in the flow path between the inlet B1 of the switch valve B and the nozzle opening (outlet) N2a of the camera washer nozzle N2, it may be only required to place the single check valve 70 on the downstream side of all of the control conduits in the flow path.

In the above embodiment, the washer fluid is selectively fed to the two washing subjects (the rear window glass 4 and the onboard camera 20). Alternatively, the washer fluid may be fed to three or more washing subjects. The washing subjects may additionally include, for example, a front window glass, an onboard camera, which captures an image of another side (e.g., a front side, a lateral side) of the vehicle that is other than the rear side of the vehicle, a headlight(s) and an outer rear view mirror(s).

In the above embodiment, the washer fluid is selectively supplied to the rear washer nozzle N1 and the camera washer nozzle N2 through the switch valve B. Alternatively, a bifurcated pipe (branched pipe) may be connected to a distal end portion of the main conduit 8, and a solenoid valve, which opens or closes the conduit, may be placed between the bifurcated pipe and the rear washer nozzle N1, and another solenoid valve, which opens or closes the conduit, may be placed between the bifurcated pipe and the camera washer nozzle N2. By complementarily opening and closing these two solenoid valves, the washer fluid can be selectively fed to the rear washer nozzle N1 and the camera washer nozzle N2.

The locations of the washer switch SW1 and the rear wiper switch LSW may be appropriately changed. Further alternatively, the washer switch SW1 and the rear wiper switch LSW may be placed at different locations, respectively.

In the above embodiment, the switch valve B connects the second conduit 10 to the main conduit 8 synchronously with the manipulation of the shift lever 3. Alternatively, the valve (spool valve) of the switch valve B may be switched by a different manner, which is independent from the manipulation of the shift lever 3.

In the above embodiment, the switch valve B is connected to the distal end portion (the rear end portion, i.e., the downstream end portion) of the main conduit 8. Alternatively, the switch valve B may be integrally formed with the electromagnetic pump P placed in the front engine room.

In the above embodiment, the washer system of the present disclosure is applied to wash the onboard camera 20, which is the rear view camera for monitoring the rear side (back side) of the vehicle. Alternatively, the washer system of the present disclosure may be implemented as a washer system that includes a camera washer nozzle, which washes another type of onboard camera, such as a side view camera for monitoring a side view of the vehicle, a front view camera for monitoring a front side of the vehicle.

Additional advantages and modifications will readily occur to those skilled in the art. The present disclosure in its broader terms is therefore not limited to the specific details, representative apparatus, and illustrative examples shown and described.

What is claimed is:

1. A washer system, comprising:
a pump that is installed in a vehicle to pump washer fluid, which is stored in a tank of the vehicle, that is installed outside of the tank, and that is connected to the tank;
a plurality of nozzles, each of which is placed on the vehicle at a position to correspond with a corresponding one of a plurality of washing subjects of the vehicle, wherein each of the plurality of nozzles sprays the washer fluid over the corresponding one of the plurality of washing subjects upon receiving the washer fluid from the pump;
a switching device that is installed in the vehicle and that switches a supply destination of the washer fluid, which is pumped from the pump, among the plurality of nozzles; and
a flow limiter that is placed in a flow path between an inlet of the switching device and an outlet of a corresponding one of the plurality of nozzles and that limits a flow quantity of the washer fluid, which is fed from the switching device to the outlet of the corresponding one of the plurality of nozzles.

2. The washer system according to claim 1, wherein:
the flow limiter includes:
an inlet, through which the washer fluid is inputted into the flow limiter;
an outlet, through which the washer fluid is outputted from the flow limiter;
a limiting flow passage communicates between the inlet and the outlet in the flow limiter; and
the limiting flow passage includes a constriction that has an inner diameter, which is smaller than an opening diameter of the inlet.

3. The washer system according to claim 2, wherein the limiting flow passage is tapered from the inlet to the constriction to have a progressively decreasing inner diameter, which progressively decreases from the inlet to the constriction.

4. The washer system according to claim 3, wherein the limiting flow passage is tapered from the outlet to the constriction to have a progressively decreasing inner diameter, which progressively decreases from the outlet to the constriction.

5. The washer system according to claim 1, wherein:
the flow limiter includes:
a first housing that includes an inlet, through which the washer fluid is inputted into the flow limiter, and a first flow passage, which conducts the washer fluid inputted into the first housing through the inlet; and
a second housing that is fluid-tightly connected to the first housing and includes a second flow passage, which is communicated with the first flow passage, and an outlet, through which the washer fluid is outputted from the second flow passage; and
the first housing and the second housing are connected with each other and are movable relative to each other; and
at least one of the first housing and the second housing includes a flow quantity adjusting portion, which is adapted to locally change a cross-sectional area of at least one of the first flow passage and the second flow passage in response to relative movement between the first housing and the second housing.

6. The washer system according to claim 1, wherein:
a check valve is placed on a downstream side of the flow limiter in the flow path;
the check valve disables flow of the washer fluid from a downstream side of the check valve to an upstream side of the check valve through the check valve; and
the check valve enables flow of the washer fluid from the upstream side of the check valve to the downstream side of the check valve through the check valve.

7. The washer system according to claim 1, wherein the flow limiter is connected to the switching device through a first conduit portion and is connected to the corresponding one of the plurality of nozzles through a second conduit portion.

8. The washer system according to claim 1, wherein:
the plurality of washing subjects includes an onboard camera that is installed to the vehicle and that includes a lens that captures an image around the vehicle; and
the flow limiter is placed between the switching device and the corresponding one of the plurality of nozzles, which is a camera washer nozzle that sprays the washer fluid over the onboard camera upon receiving the washer fluid from the pump.

9. The washer system according to claim 8, wherein:
the plurality of washing subjects further includes a window glass of the vehicle;
the plurality of nozzles further includes a window glass washer nozzle that is placed adjacent to the window glass to spray the washer fluid over the window glass;
a first outlet of the switching device is connected to the window glass washer nozzle through a first conduit, which has a generally constant inner diameter along an entire extent of the first conduit; and
a second outlet of the switching device is connected to the camera washer nozzle through a second conduit, which has a generally constant inner diameter along an entire extent of the second conduit except a portion of the second conduit where the flow limiter is inserted.

10. The washer system according to claim 9, wherein the inner diameter of the first conduit is generally the same as the inner diameter of the second conduit.

11. The washer system according to claim 1, wherein the flow limiter is formed integrally with the corresponding one of the plurality of nozzles.

12. The washer system according to claim 1, wherein the flow limiter is formed integrally with the switching device.

13. The washer system according to claim 1, wherein the flow limiter is configured to reduce a flow quantity of the washer fluid, which is fed from the switching device to the corresponding one of the plurality of nozzles through the flow limiter, in comparison to a flow quantity of the washer fluid, which is fed from the switching device to another one of the plurality of nozzles without passing through the flow limiter.

14. The washer system according to claim 1, further comprising a controller installed within the vehicle and configured to control the pump, the plurality of nozzles, the switching device, and the flow limiter.

15. The washer system according to claim 1, further comprising a vehicle housing that houses the pump, the tank, the plurality of nozzles, the switching device, the flow limiter, and the plurality of washing subjects.

* * * * *